(12) United States Patent
Hoghoj et al.

(10) Patent No.: US 11,275,038 B2
(45) Date of Patent: Mar. 15, 2022

(54) METHOD AND APPARATUS FOR X-RAY SCATTERING MATERIAL ANALYSIS

(71) Applicant: XENOCS SAS, Grenoble (FR)

(72) Inventors: Peter Hoghoj, Grenoble (FR); Blandine Lantz, Grenoble (FR); Karsten Joensen, Amherst, MA (US); Soren Skou, Horsholm (DK)

(73) Assignee: XENOCS SAS, Grenoble (FR)

( * ) Notice: Subject to any disclaimer, the term of this patent is extended or adjusted under 35 U.S.C. 154(b) by 0 days.

(21) Appl. No.: 17/054,457

(22) PCT Filed: May 15, 2019

(86) PCT No.: PCT/EP2019/062453
§ 371 (c)(1),
(2) Date: Nov. 10, 2020

(87) PCT Pub. No.: WO2019/219737
PCT Pub. Date: Nov. 21, 2019

(65) Prior Publication Data
US 2021/0364454 A1    Nov. 25, 2021

(30) Foreign Application Priority Data
May 15, 2018   (EP) .................................. 18290051

(51) Int. Cl.
*G01N 23/201* (2018.01)
*G01N 23/207* (2018.01)

(52) U.S. Cl.
CPC ......... *G01N 23/201* (2013.01); *G01N 23/207* (2013.01)

(58) Field of Classification Search
CPC ............... G01N 23/201; G01N 23/207; G01N 2223/054; G01N 23/2055
See application file for complete search history.

(56) References Cited

FOREIGN PATENT DOCUMENTS

| EP | 3246695 A1 * | 11/2017 | ............. G01N 23/20 |
|---|---|---|---|
| EP | 3246695 A1 | 11/2017 | |

OTHER PUBLICATIONS

Arnau Casanas et al: "EIGER detector: application in macromolecular crystallography", Acta Crystallographica/ID. Section D, Biological Crystallography, vol. 72, No. 9, Sep. 1, 2016 (Sep. 1, 2016), pp. 1036-1048, XP055614910, Oxford ISSN: 2059-7983, DOI: 10.1107/S2059798316012304.
Brian Richard Pauw: "Everything SAXS: small-angle scattering pattern collection and correction", Journal of Physics: Condensed Matter, Institute of Physics Publishing, Bristol, GB, vol. 25, No. 38, Aug. 29, 2013 (Aug. 29, 2013), p. 383201, XP020250829, ISSN: 0953-8984, DOI: 10.1088/0953-8984/25/38/383201.
International Search Report and Written Opinion for corresponding PCT applicaton No. PCT/EP2019/062453, dated Sep. 6, 2019.

* cited by examiner

*Primary Examiner* — David P Porta
*Assistant Examiner* — Mamadou Faye
(74) *Attorney, Agent, or Firm* — Notaro, Michalos & Zaccaria P.C.

(57) ABSTRACT

A method for X-Ray Scattering material analysis, in particular Small Angle X-ray Scattering material analysis for generating and directing an incident X-ray beam along a propagation direction to a sample held in a sample environment executing a sample measurement process. An apparatus adapted to carry out such a method is also disclosed.

15 Claims, 11 Drawing Sheets

METHOD AND APPARATUS FOR X-RAY SCATTERING MATERIAL ANALYSIS

The present invention relates to a method for X-Ray Scattering material analysis, in particular Small Angle X-ray Scattering material analysis, and an apparatus for carrying out such a method.

While Wide Angle X-ray Scattering (WAXS) typically gives access to information on crystalline structure and phase(s) of a sample to be analyzed, Small Angle X-ray Scattering (SAXS) typically gives access to information about the sample structure on the nano-scale level (nano-structure). Examples are solid polymer films, alloys or powders constituting a sample whose nano-structure is analyzed. However, the invention also relates to cases in which SAXS is used to obtain information about one among a plurality of components of the sample. Often such samples analyzed by SAXS are analytes diluted in a sample solvent and contained in a sample container like e.g. a capillary. As a typical example dispersions of nano-particle micelles can be mentioned.

A method for X-Ray Scattering material analysis, in particular Small Angle X-ray Scattering material analysis, comprising:

generating and directing an incident X-ray beam along a propagation direction to a sample held in a sample environment;

executing a sample measurement process comprising the following steps:
  determining a distribution of X rays scattered from said sample by means of an area detector arranged downstream of said sample environment; and
  determining an intensity $I_t$ of a beam of X rays transmitted through said sample by means of said detector;

executing a sample data treatment process comprising the following step:
  determining an absolute scattered X-ray distribution by applying to said scattered X-ray distribution a conversion into absolute intensities which depends on said transmitted intensity; and executing a data analysis process comprising the following step:
  determining at least one structural characteristic of said sample on the basis of said absolute scattered X-ray distribution;

is generally known to the skilled person in the field of material analysis by means of X-ray scattering.

Such X-Ray Scattering material analysis methods require measurement of scattered intensity in so-called absolute intensities for determining the desired structural characteristic(s) of the sample on the basis of a relation between the scattered X-ray distribution and the transmitted X-ray intensity. This means that the intensity of the X-ray beam transmitted through the sample needs to be measured to apply certain corrections required to get the scattered signal in absolute intensity. This, however, poses problems in that the transmitted intensity is up to many orders of magnitude stronger than the scattered signal so that the large transmitted intensity easily drives the area detector out of its linear counting range or even risks destroying the detector. In state of the art methods, this problem is taken into account e.g. either by collecting the transmitted signal with the area detector with an attenuation of the transmitted intensity through an attenuator or a semi-transparent beamstop or by using a second detector like a beamstop with a pin diode incorporated inside. Alternatively, the absolute intensity is obtained through the measurement the scattering intensity of a reference sample.

The area detector can be a 1D or a 2D detector. In the following the preferred case of a 2D detector will be predominantly considered.

Furthermore SAXS detectors require a low intrinsic noise and except for modern solid-state detectors working on direct detection mode with individual pixel counters (the so-called hybrid pixel detectors), those detectors suffer from low maximum count rate and/or detector damage risk like for gas detectors with respect to transmitted beam intensities found in modern SAXS instruments. Therefore in prior art SAXS methods typically use is made of one or several beam stops in front of the 2D detector to attenuate the intensity of the direct beam passing through the sample, i.e. the transmitted beam, by a semi-transparent beam stop or to completely prevent the direct X-ray beam from reaching the detector by a fully absorbing beam stop. In the latter case determination of the transmitted intensity then has to be carried out before or after the scattering measurements with short counting times and/or with a different acquisition device, e.g. a pin diode.

State of the art advanced combined SAXS/WAXS systems use a beamstop and a hybrid pixel detector preferably placed inside a vacuum chamber environment in order to reduce air and vacuum-window parasitic scattering.

However, in all these prior art approaches a semitransparent beam stop itself causes parasitic scattering and furthermore causes so-called beam hardening effects, i.e. it affects the spectrum of the incident X-ray beam, making precise determination of transmitted intensity unreliable. Furthermore use of a semitransparent or completely absorbing beam stop is always laborious in that it requires a time-consuming precise positioning of the beam stop in the transmitted beam minimizing its impact on the scattered signals.

It is therefore an object of the invention to overcome such problems related to the use of a beam stop.

According to the invention this object is achieved in a Small Angle X-ray scattering material analysis method as outlined above in which:

acquisition of said scattered and said transmitted X-rays is divided into a plurality of acquisition periods, wherein each acquisition period ($T_{acq}$) is shorter than or equal to a previously determined maximum acquisition time ($T_{max}$) in such a way that said detector operates in a linear range;

said detector measures individual detector image frames containing signals of said scattered and said transmitted X-rays, wherein each individual detector image frame is measured during one among said plurality of acquisition periods;

said individual detector image frames are added up to a total detector image frame in a computer connected to said detector; and said determination of said at least one structural characteristic of said sample is realized based on an absolute scattered X-ray distribution obtained on the basis of said total detector image frame.

According to the invention each individual detector image frame is measured during an acquisition period which is short enough to make sure that the detector operates in its linear range. After a certain number of individual detector image frames has been measured the counting electronics of the detector are reset so that the detector starts counting the next individual detector image frame basically from 0.

Depending on the linearity requirements of the detector its counting electronics can e.g. be reset and restarted after each individual detector image frame or after every $2^{nd}$ individual detector image frame etc. to make sure that the detector always stays in its linear operation range. Thus also the total detector image frame obtained by adding up the individual detector image frames in the computer is free from any nonlinear distortions.

The method according to the invention assures a linear operation range of the detector while allowing to collect simultaneously the transmitted signal, i.e. the X-ray beam passing through the sample and the sample environment and reaching the detector without being attenuated and having its spectrum affected by a beam stop, during the complete scattering measurement. This provides several advantages compared to prior art methods using a semi-transparent beamstop or a second detector. Because one uses the same detector as the one used to collect the scattered signal, accuracy of the overall measurement of the scattering intensity of sample in absolute units is improved as there are no problems with different detector efficiencies and gain. Moreover, compared to alternative methods using a short and separate acquisition (typically 0.1 seconds) and collection of transmitted intensity before and/or after the scattering measurement with a different acquisition device, e.g with a pin diode, the simultaneous collection method according to the invention is more accurate as it suppresses the impact of possible intensity variations of the incoming X-ray beam during the complete sample measurement and the influence of different detector efficiencies. Also, variations in sample characteristics and scattering can be resolved and data used by determining the integration time after the experiment In a preferred embodiment of the method according to the invention said total detector image frame is displayed and continuously updated with each additional individual detector image frame on a screen connected to said computer. This allows a user carrying out the SAXS measurement to continuously monitor the experiment.

Preferably the method according to the invention furthermore comprises a maximum acquisition time determining process executed before said sample measurement process, wherein said maximum acquisition time determining process comprises:
  measuring said intensity $I_t$ of a beam of X rays transmitted through said sample; and
  calculating said maximum acquisition time on the basis of said intensity $I_t$.

This calculation of the maximum acquisition time to be used as an upper time limit for each individual detector image frame usually implies dividing an allowable total count number of the area detector as indicated by the manufacturer of the detector in the detector specification by the measured intensity $I_t$.

Advantageously the method according to the invention furthermore comprises a beam resolution determining process executed before said sample measurement process, wherein said beam resolution determining process comprises:
  measuring at least one individual detector image frame containing signals of an X-ray beam transmitted through said sample environment and of X rays scattered from said sample environment preferably in a situation in which no sample and no sample solvent is held in said sample environment; and
  determining a beam resolution of said transmitted X-ray beam from said at least one individual detector image frame.

This advantageous embodiment allows to characterize very accurately the X-ray beam profile used for the experiment and to quantify the beam resolution. This is particularly useful for analysis methods like particle size distribution analysis where the quantification of the beam resolution and its inclusion within the modelling process increases the accuracy of the data analysis and consequently the accuracy of the determined particle size. Preferably this beam resolution determining process is carried out without a sample or a sample solvent in the beam, but usually with a sample container like e.g. a capillary in the beam. However the beam resolution determining process can also be carried out with the sample in place. In this case, the PSF of the direct beam is determined from the central part of the beam corresponding to no momentum transfer Q=0, i.e. a scattering vector modulus of zero, and using the first points from the 1D intensity distribution up to a dynamic of 1E3 approximately.

In these advantageous embodiments it is further preferred that said step of determining a beam resolution comprises executing an azimuthal averaging of said at least one individual detector image frame such as to convert a 2D signal intensity distribution in said individual detector image frame or in a total detector image frame obtained by adding up said individual detector image frames into a 1D intensity distribution as a function of momentum transfer (Q), i.e. scattering vector modulus.

The point spread function (PSF) of the incoming beam can then be obtained as follows. A direct beam image is azimuthally averaged and reduced to 1D scattering data (I=f(Q)) on the same units grid (in Q or 2θ angle) as the one used for reducing the sample scattering data. A convolution kernel is built from the PSF and further on included in the models used to fit the data. This method accounts for the beam smearing effects in any (arbitrary) model, irrespective of the model's details and parameters. The data analysis process comprises optimizing the model parameters including smearing effects with respect to the experimental data. In other words, the beam convolution effects are considered in the forward model, which yields an increase in the stability of the results as compared to the alternative of refining the raw model on the deconvoluted experimental data.

Preferably the method according to the invention furthermore comprises a sample environment calibration process executed before said sample measurement process, wherein said sample environment calibration process comprises:
  measuring individual detector image calibration frames containing signals of said scattered and said transmitted X-rays by means of said detector in a situation in which no sample is held in said sample environment, wherein each individual detector image calibration frame is measured during one among a plurality of calibration acquisition periods;
  adding up said individual detector image calibration frames to a total detector image calibration frame in said computer connected to said detector;
  determining a transmitted intensity and a beam center position from said total detector image calibration frame.

Also in this case said sample environment calibration process preferably furthermore comprises executing an azimuthal averaging of said total detector image calibration frame such as to convert a 2D signal intensity distribution in said total detector image calibration frame into a 1D calibration intensity distribution as a function of momentum transfer (Q).

As a particular advantage of this embodiment, said conversion may be realized continuously between scattered signals corresponding to a finite momentum transfer Q>0 and transmitted signals measured along said propagation direction (X) corresponding to no momentum transfer Q=0.

In all embodiments of the method according to the invention, said data analysis process preferably comprises:
  determining a transmitted intensity and a beam center position from said total detector image frame.

It is further preferred that said data analysis process furthermore comprises:
  executing an azimuthal averaging of said total detector image frame such as to convert a 2D signal intensity distribution in said total detector image frame into a 1D intensity distribution as a function of momentum transfer (Q).

Said conversion may be realized continuously between scattered signals corresponding to a finite momentum transfer Q>0 and transmitted signals measured along said propagation direction (X) corresponding to no momentum transfer Q=0.

In all embodiments that make use of the above-discussed 1D calibration intensity distribution it is furthermore preferred to correct said 1D intensity distribution by means of said 1D calibration intensity distribution. As a simple example, the 1D calibration intensity distribution determined in the sample environment calibration process can be subtracted from the 1D intensity distribution determined during the sample data analysis process.

This correction of the 1D intensity distribution by means of said 1D calibration intensity distribution allows to provide a further advantage when the method according to the invention furthermore comprises a data quality control process in which a signal to noise ratio in a predetermined range of momentum transfer (Q) in said corrected 1D intensity distribution is compared to a predetermined threshold and a feedback action is executed depending on the result of said comparison.

Preferably said feedback action comprises at least one of the following:
  stopping said sample measurement process;
  changing a position of said area detector;
  changing an opening of one or more collimating apertures.

In the $1^{st}$ case, for example, said sample measurement process is automatically stopped when a signal to noise ratio in a predetermined range of momentum transfer (Q) in said corrected 1D intensity distribution exceeds a predetermined threshold. This renders the entire SAXS measurement faster and requires less user interaction. The term "signal to noise ratio" is intended to also comprise similar statistics known to the skilled person in the field of data quality evaluation.

In all embodiments the method according to the invention can preferably furthermore comprise a data posttreatment process, comprising a background removal step in which background signals are removed from said individual detector image frames based on a comparison with said total detector image frame, wherein said background corrected individual detector image frames are added up to a total background corrected detector image frame in said computer, and wherein a background corrected determination of said at least one structural characteristic of said sample is realized based on said total background corrected detector image frame.

The background signals removed from said individual detector image frames result in particular from inevitable ambient background, also called cosmic background. The comparison of individual detector image frames with the total detector image frame in order to identify such background signals is preferably carried out on a pixel-by-pixel basis using statistical algorithms confronting its experimental statistics to the theoretical statistics expected for the counting process.

The data posttreatment process can furthermore comprise determining a background corrected transmitted intensity and a background corrected beam center position from said total background corrected detector image frame.

In this case the data posttreatment process can preferably furthermore comprise executing an azimuthal averaging of said total background corrected detector image frame such as to convert a 2D signal intensity distribution in said total background corrected detector image frame into a 1D background corrected intensity distribution as a function of momentum transfer (Q).

This conversion may be realized continuously between background corrected scattered signals corresponding to a finite momentum transfer Q>0 and background corrected transmitted signals measured along said propagation direction (X) corresponding to no momentum transfer Q=0.

In this embodiment the method according to the invention can furthermore comprise correcting said 1D background corrected intensity distribution by means of said 1D calibration intensity distribution.

In a further preferred embodiment of the method according to the invention, the data posttreatment process is also applied to the individual detector calibration image frames in which background signals are removed from said individual detector image frames based on a comparison with said total detector image frame, wherein said background corrected individual detector calibration image frames are added up to a total background corrected detector calibration image frame.

In this further preferred embodiment of the method according to the invention correcting said 1D background corrected intensity distribution can be executed by means of said 1D background corrected calibration intensity distribution All embodiments of the method according to the invention can preferably furthermore comprise executing UV-Vis analysis on said sample, preferably simultaneously with said sample measurement process.

UV-Vis analysis in combination with SAXS is useful since knowing the concentration of the biomolecules exposed to SAXS is important for correct molecular weight estimation and SAXS intensity scales with the sample concentration.

Preferably said sample environment comprises a capillary containing said sample and an evacuated capillary holder block holding said capillary, wherein UV-Vis lenses through which incoming UV-Vis light is directed to said sample and transmitted UV-Vis light is directed to a spectrometer, respectively, are inserted into said capillary holder block.

In order to get a good signal-to-noise ratio on biological samples, there should be vacuum all the way from the source X-ray window to the detector, and the only X-ray window to the sample should be the capillary itself. The design according to this preferred embodiment achieves this by mounting the UV-Vis lenses into the capillary holder block, using the UV-Vis lenses themselves as vacuum windows, thus exposing the lenses directly to vacuum and not through a separate vacuum window. This also ensures no UV-Vis intensity is lost through a separate vacuum window. To make the UV-Vis lenses vacuum tight they can be modified with glue around the edges of the lenses and a respective lens holder of the capillary holder block. The lens holder itself can be made vacuum compatible using a disc O-ring.

Advantageously said UV-Vis lenses are mounted into said capillary holder block in a vacuum tight manner.

As a typical application of the method according to the invention, said structural characteristic to be determined can be a particle size distribution, a particle surface area distribution, a radius of gyration and/or a shape of particles within said sample.

In a further embodiment the method according to the invention can be applied to study the evolution of a sample structural characteristic during changing conditions such as a temperature or humidity change of the sample, or a continuous flow of the sample within the sample environment for example coming from a FPLC column (Fast Protein Liquid Chromatography) wherein the data analysis process includes a process to determine an optimized integration time for summing the individual detector image frames performed after the sample measurement process in which individual detector image frames are summed iteratively and quality of the 1D intensity distribution of the momentary detector image frames obtained are compared to each other for the purpose of achieving the best possible data quality without affecting the time resolution of the experiment. In a preferred embodiment of such method, the criteria determining the resolution of the experiment are based on an analysis of an external parameter such as the UV-VIS transmission signal from the sample to determine a possible change of sample conditions. In a preferred embodiment of such method the quality of the 1D intensity distribution of the momentary detector image frames are evaluated based on the analysis of the signal to noise ratio in a predetermined range of momentum transfer (Q) or by calculating primary fit parameters from 1D intensity distribution such as Radius of Gyration.

The invention furthermore relates to an apparatus for X-Ray Scattering material analysis, in particular Small Angle X-ray Scattering material analysis, designed to execute the method according to any of the preceding claims.

A preferred embodiment of the Small Angle X-ray scattering material analysis method and apparatus according to the invention will be described in the following with reference to the attached drawings, in which:

FIG. 8b shows a 1D intensity distribution as a function of momentum transfer Q determined on the basis of the total detector image frame of FIG. 8a;

FIG. 9b shows a 1D background corrected intensity distribution as a function of momentum transfer Q determined on the basis of the total background corrected detector image frame of FIG. 9a.

Figure 1A:
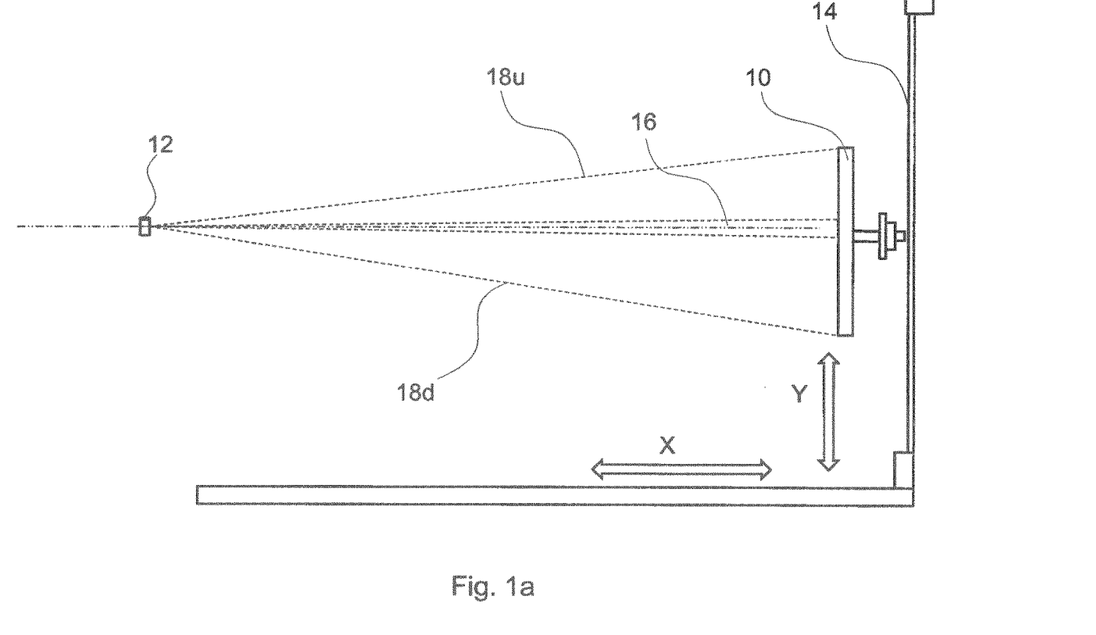
FIG. 1a shows a schematic side view of an X-ray scattering apparatus according to an embodiment of the invention.

FIG. 1a shows a schematic side view of a preferred embodiment of the X-ray scattering apparatus according to the invention. The apparatus comprises a two-dimensional X-ray detector 10 arranged downstream of a sample environment (not shown) for holding a sample 12 to be analyzed by X-ray scattering in a holding position. The terms "upstream" and "downstream" refer to the propagation direction X of the direct X-ray beam arriving from an X-ray beam delivery system (not shown) arranged upstream of the sample environment for generating and directing a direct X-ray beam along the propagation direction X towards the sample environment. Such X-ray beam delivery systems typically comprise an X-ray generator, for example a microfocus sealed tube source or rotating anode tube, a collimating or focusing monochromator for selecting a predetermined X-ray wavelength such as multilayer coated x-ray mirrors, and slits defining collimating apertures for shaping the profile of the X-ray beam arriving at the sample environment and controlling its divergence and shape towards the distal X-ray detector, and further X-ray equipment known to the skilled person. In FIG. 1a the direction from upstream to downstream is therefore from left to right. The X-ray beam delivery system can generate a 1D conditioned X-ray beam using a line focus source and 1D X-ray beam shaping optics. In a preferred embodiment, the X-ray beam delivery system generates a 2D conditioned X-ray beam using a point focus and 2D X-ray beam shaping optics. In such a case the X-ray detector 10 can have a 2D array of pixels adapted for the analysis of anisotropic samples. X-ray scattering measurements usually require beam path evacuation under vacuum or helium to reduce the generation of parasitic scattering from air. The scattering beampath thus usually requires to be in vacuum and in a preferred embodiment the detector 10 is located inside a vacuum diffracted beam pipe which can be connected to a vacuum sample chamber or part of single volume chamber including the incident beam path and sample environment.

The apparatus according to the invention shown in FIG. 1a does not require a beam stop, contrary to SAXS apparatus in the prior art.

As indicated by arrows in FIG. 1a, the 2D detector 10 may be mounted on a detector stage 14 such as to be movable in the X direction and the perpendicular Y direction under the control of a central control computer of the SAXS apparatus.

In FIG. 1a an X-ray beam transmitted through the sample and essentially propagating along the original propagation direction X towards the detector 10 is indicated by reference number 16.

Furthermore an X-ray beam scattered by the sample 12 in an upward direction is indicated by reference number 18u whereas a corresponding X-ray beam scattered in a downward direction is indicated by reference number 18d.

Figure 1B:
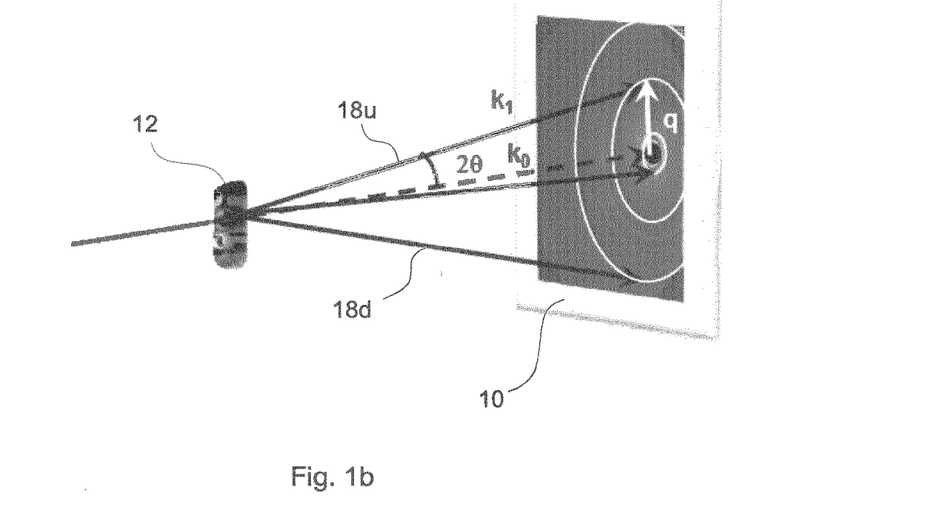
FIG. 1b shows a schematic perspective view of the X-ray scattering apparatus of FIG. 1a during a SAXS measurement.

FIG. 1b shows a schematic perspective view of the X-ray scattering apparatus of FIG. 1a during a SAXS measurement. The transmitted beam 16 is represented by a dashed line, its wave number is indicated as k0. The upward scattered beam 18u and the downward scattered beam 18d are represented by solid lines.

As shown in FIG. 1b the 2D detector measures a rotationally symmetric intensity distribution of scattered signals. All points lying on a circle having its center at the position of the transmitted beam in a corresponding image frame measured by the detector 10 belong to scattering processes with the same scattering angle 2θ and therefore the same momentum transfer, indicated as q in FIG. 1b.

Figure 2:
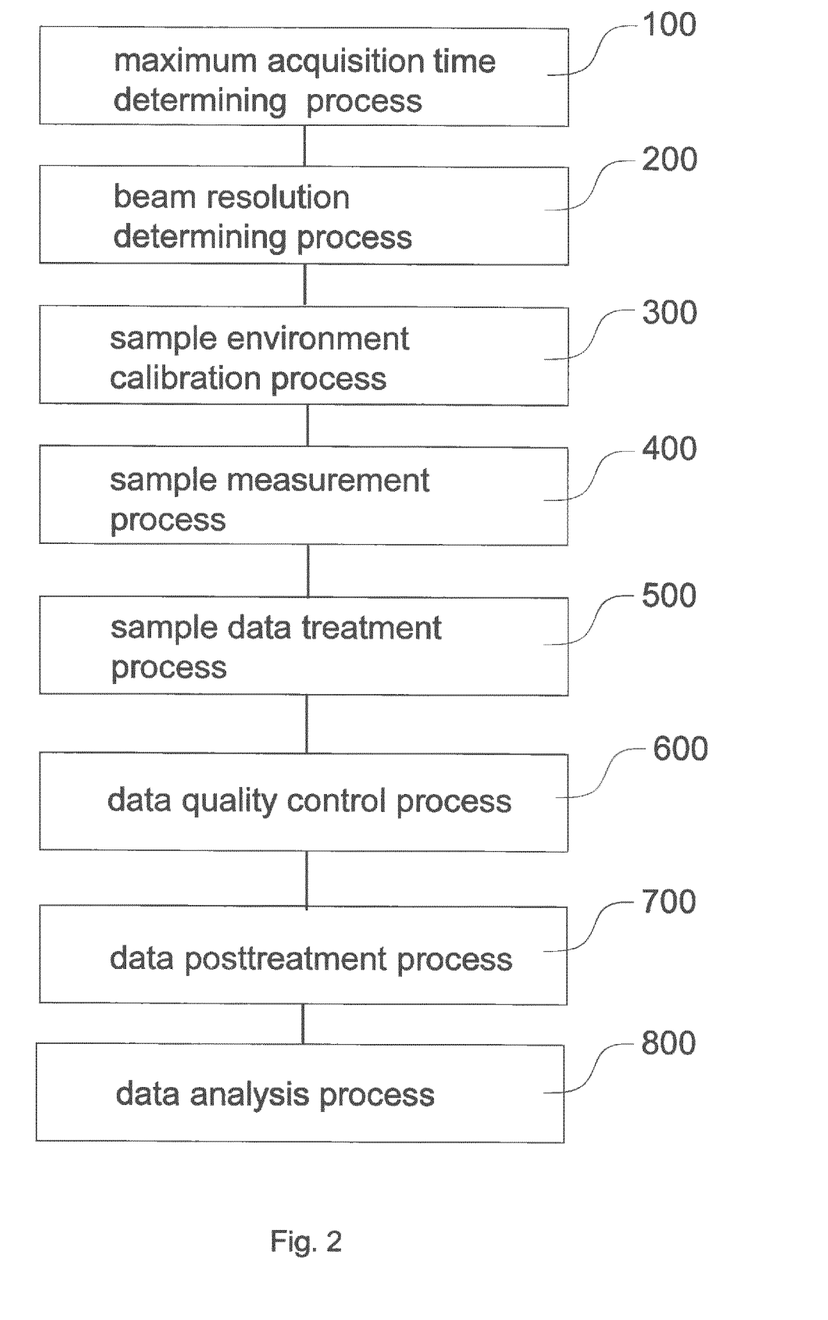
FIG. 2 shows a schematic flowchart of the various processes of a preferred embodiment of the method according to the invention.

FIG. 2 shows a schematic flowchart of the various processes of a preferred embodiment of the method according to the invention, comprising a maximum acquisition time determining process 100, a beam resolution determining process 200, a sample environment calibration process 300, a sample measurement process 400, a sample data treatment process 500, a data quality control process 600, a data posttreatment process 700, and a data analysis process 800. Processes 100 to 600 are carried out while the sample is illuminated by the incoming X-ray beam. Data posttreatment process 700 is usually carried out after the X-ray sample measurements have been terminated. In the embodiment shown in FIG. 2 data analysis process 800 is only carried out after data posttreatment process 700. However, in alternative embodiments data analysis process 800 can be carried out in real time while the sample measurement is still continuing without using any posttreatment process refinement of data.

These processes will be explained further below in connection with FIGS. 3 to 7.

Figure 3:
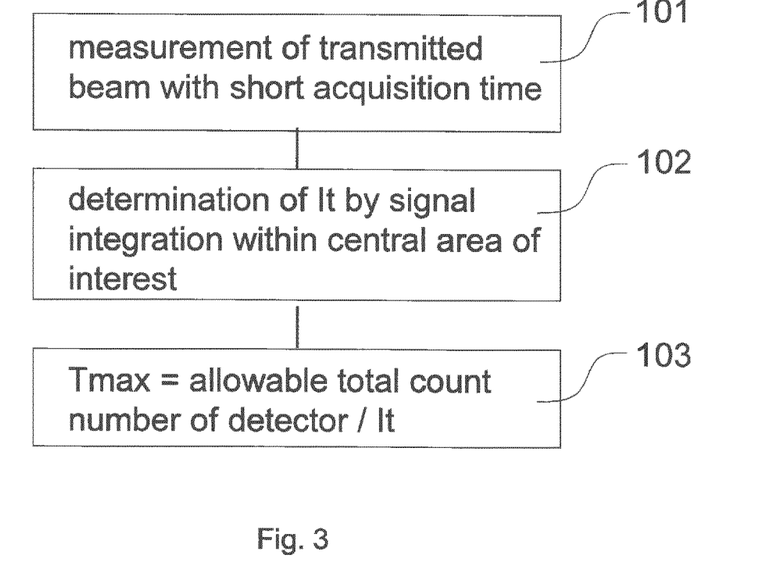
FIG. 3 shows a schematic flowchart of the steps of a maximum acquisition time determining process in the preferred embodiment of the method according to the invention.

FIG. 3 shows a schematic flowchart of the steps of a maximum acquisition time determining process 100 in the preferred embodiment of the method according to the invention. In a step 101 the beam transmitted through the sample in its sample environment is measured with a short acquisition time of e.g. 0.1 s. Then, in step 102 the transmitted intensity $I_t$ is determined by integrating the signal in the detector 10 within a central area of interest. Finally, in step 103 the maximum acquisition time $T_{max}$ is calculated by dividing a maximum allowable total account number of the detector 10 which is provided by the detector manufacturer by the determined value of $I_t$. In the subsequent sample measurement process 400 each individual detector image frame will be measured during an acquisition period $T_{acq}$ shorter than or equal to $T_{max}$. This assures that the detector 10 always stays within its linear detection range.

Figure 4:
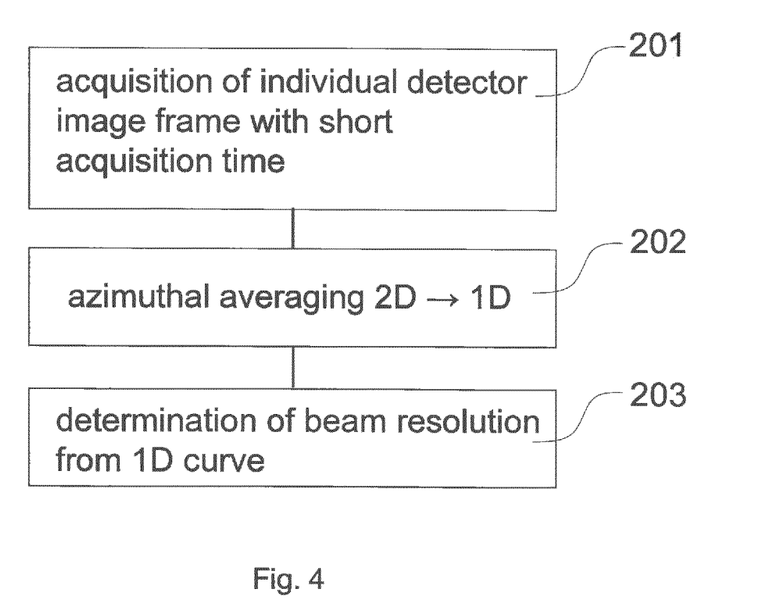
FIG. 4 shows a schematic flowchart of the steps of a beam resolution determining process in the preferred embodiment of the method according to the invention.

FIG. 4 shows a flowchart of the steps of a beam resolution determining process 200 in the preferred embodiment of the method according to the invention. In a step 201 an individual detector image frame is measured with a short acquisition time, e.g. 0.1 s, in a situation in which no sample 12 is held in the sample environment. In step 202 an azimuthal averaging around the beam center is carried out in this individual detector image frame in order to convert the 2D intensity distribution as shown on the detector 10 in FIG. 1b into a 1D intensity distribution as a function of momentum transfer Q. Finally, the beam resolution is determined from this 1D intensity distribution.

Figure 5:
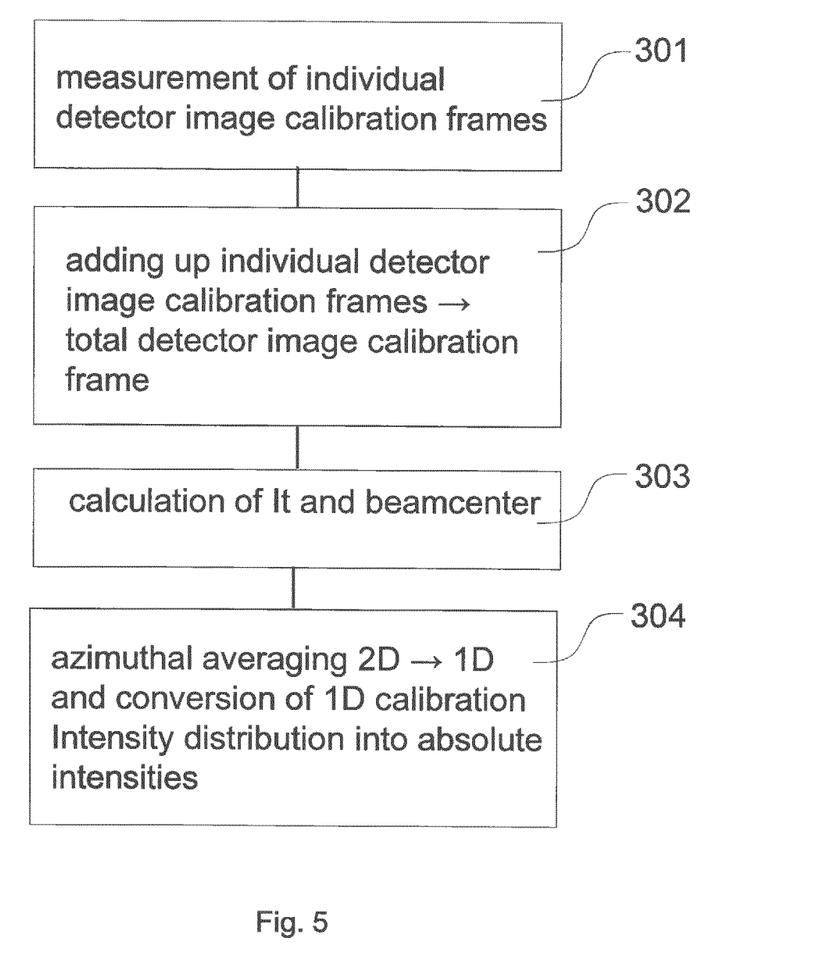
FIG. 5 shows a schematic flowchart of the steps of a sample environment calibration process in the preferred embodiment of the method according to the invention.

FIG. 5 shows a flowchart of the steps of a sample environment calibration process 300 in the preferred embodiment of the method according to the invention. In a step 301 a plurality of individual detector image calibration frames is measured. This measurement is carried out without the sample in the beam. More precisely, in case of a freestanding sample which does not require any sample container or solvent, step 301 is carried out with an essentially empty sample environment, without the sample in the incoming beam.

However, in case of a sample which requires a sample container but does not require a sample solvent, for example a powder sample, step 301 is carried out with an empty sample container in the incoming beam.

Furthermore, in case of a sample which is an analyte requiring a sample container filled with a sample solvent, step 301 is carried out with the sample container filled with sample solvent but without the analyte in the incoming beam.

In subsequent step 302 these individual detector image calibration frames are added up to a total detector image calibration frame.

Then, in step 303 the transmitted intensity $I_t$ and the beam center are determined from the total detector image calibration frame.

Finally, in step 304 an azimuthal averaging around the beam center is carried out in this individual calibration detector image frame in order to convert the 2D calibration intensity distribution into a 1D calibration intensity distribution as a function of momentum transfer Q, and the 1D intensity distribution is converted into absolute intensities based on the value of $I_t$.

Figure 6:
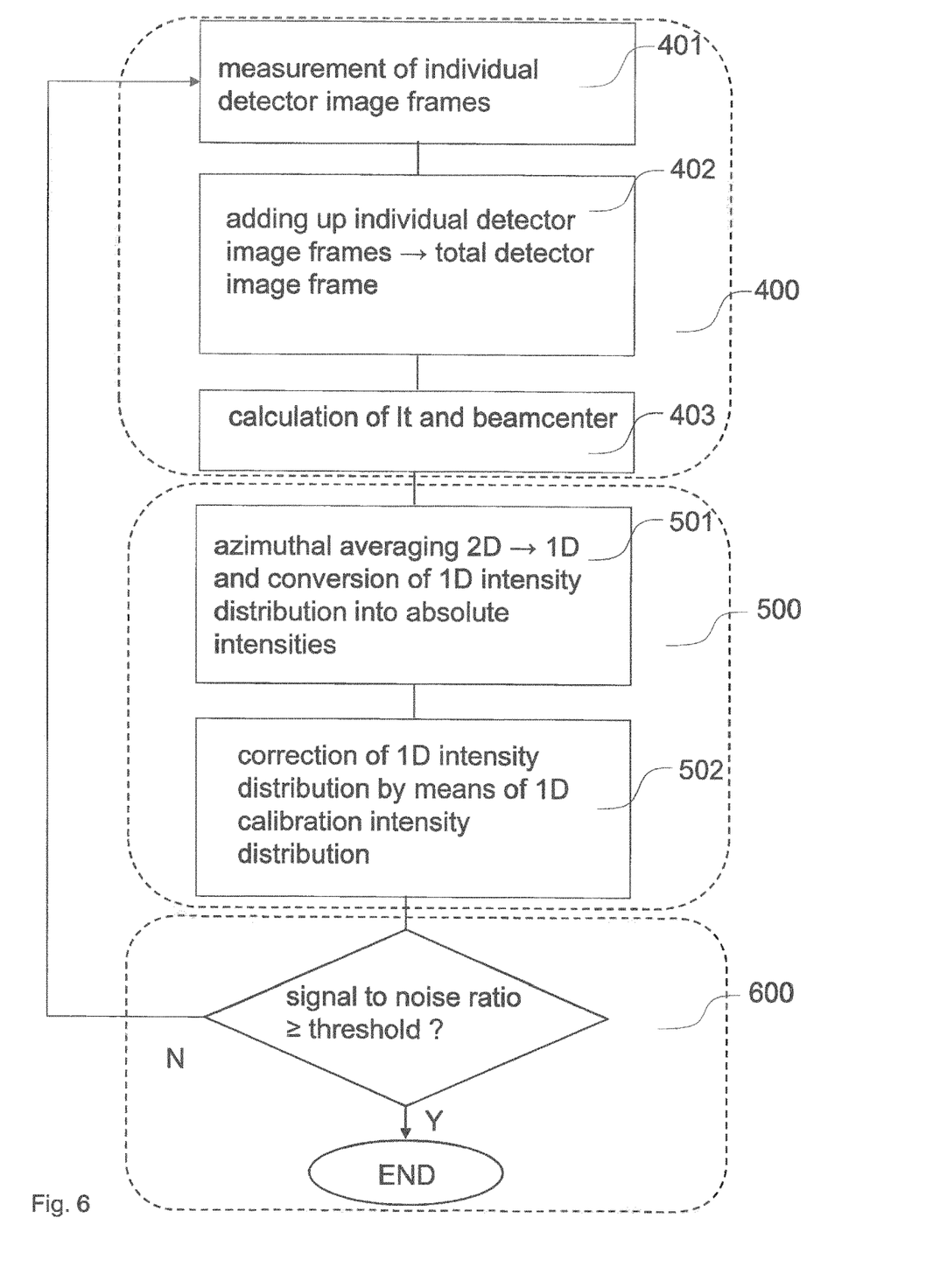
FIG. 6 shows a schematic flowchart of the steps of a sample measurement process and a subsequent sample data treatment process in the preferred embodiment of the method according to the invention.

FIG. 6 shows a schematic flowchart of the steps of a sample measurement process 400 and a subsequent sample data treatment process 500 as well as a data quality control process 600 in the preferred embodiment of the method according to the invention.

The sample measurement process 400 comprises a step 401 of measuring a new individual detector image frame, a step 402 of adding the newly measured individual detector image frame to the momentary total detector image frame, and a step 403 of calculating the transmitted intensity $I_t$ and the beam center.

The subsequent sample data treatment process 500 comprises a step 501 in which an azimuthal averaging is carried out in the total detector image frame obtained in step 402 around the beam center obtained in step 403 in order to convert the 2D intensity distribution into a 1D intensity distribution as a function of momentum transfer Q, and the 1D intensity distribution is converted into absolute intensities based on the value of $I_t$.

In a subsequent step 502 this 1D intensity distribution is corrected by means of the 1D calibration intensity distribution obtained in step 304.

In the subsequent data quality control process 600 a signal to noise ratio in a predetermined range of momentum transfer Q in said corrected 1D intensity distribution is compared to a predetermined threshold and a feedback action is executed depending on the result of said comparison. In the embodiment shown in FIG. 6 the feedback action is to terminate the measurement process 400 and the subsequent sample data treatment process 500 if the signal to noise ratio is equal to or larger than the threshold, or otherwise to revert to step 401.

In a further embodiment of the invention, the feedback action could be to define and realize one or more additional measurement steps in order to improve the signal to noise ratio in a predetermined range of momentum transfer Q in said 1D intensity distribution. Such additional measurement steps could be to acquire additional individual detector image frames with modified parameters of measurement such as measuring sample scattering with a different position of said area detector 10 or with a different opening of one or more collimating apertures. In such cases, the additional measurement steps defined could include a beam resolution determining process using the modified parameters of measurement. In such cases, the sample data treatment process includes merging the corrected 1D intensity distributions obtained by azimuthal averaging from the total detector image frames corresponding to the different sequential acquisitions performed during the complete sample measurement process. The merging process into a merged 1D intensity distribution will comprise selecting the points of the corrected 1D intensity distribution with the highest signal to noise ratio.

In such a case, the final merged 1D intensity distribution should be associated to distinct beam resolution functions for each of the individual 1D intensity distribution portions constituting such a curve, each of the beam resolution functions obtained by a different beam resolution determining process using each of the modified parameters of measurement. The beam resolution determining process can be applied also with the sample in place even if a dedicated measurement without the sample as described above in connection with FIG. 4 is preferred.

Figure 7:
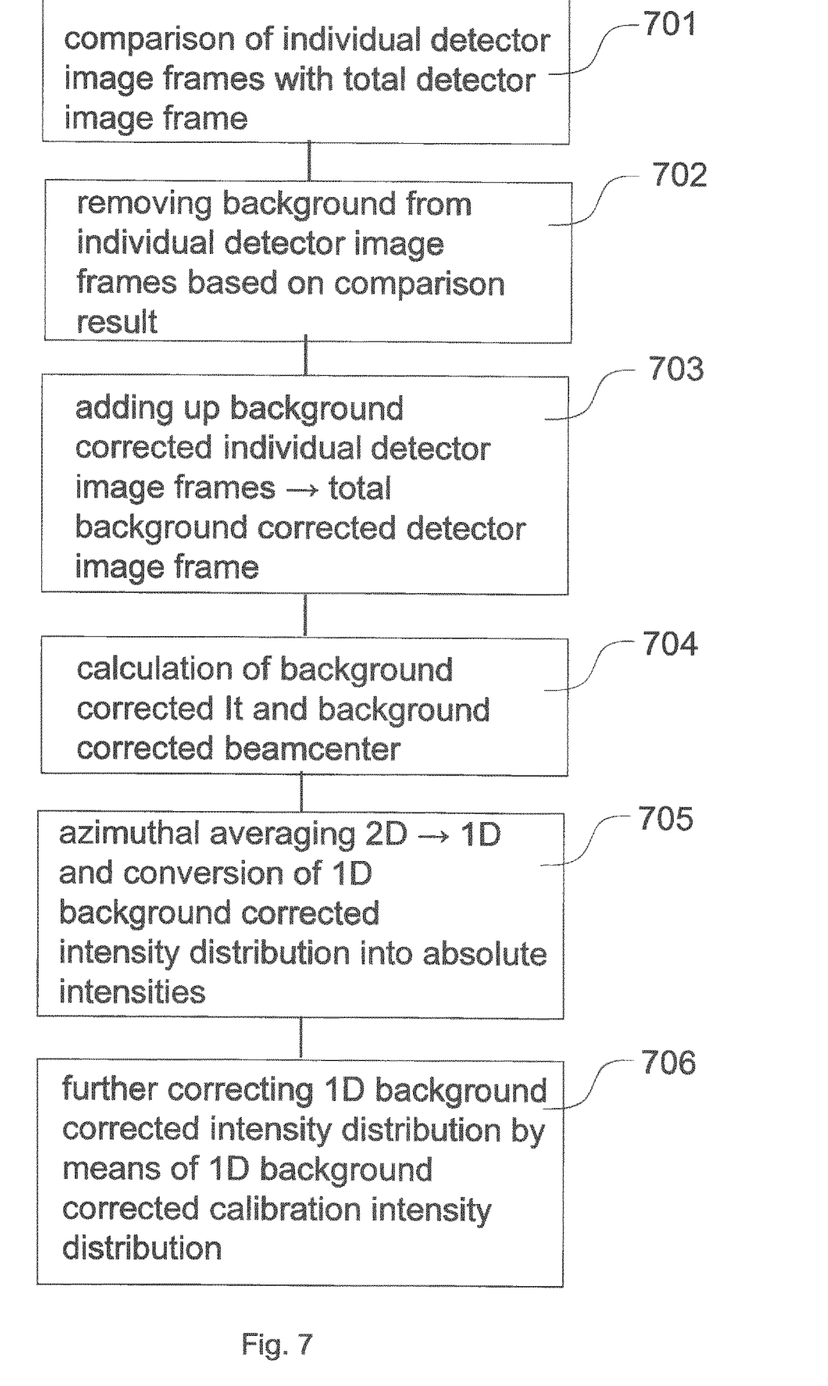
FIG. 7 shows a schematic flowchart of the steps of a sample data treatment process in the preferred embodiment of the method according to the invention.

FIG. 7 shows a schematic flowchart of the steps of a data posttreatment process in the preferred embodiment of the method according to the invention.

In a step 701 all measured individual detector image frames are compared with the total detector image frame. In a subsequent step 702 background signals, sometimes called cosmic background, are removed from the individual detector image frames based on a result of the comparison executed in step 701. In a subsequent step 703 the background corrected individual detector image frames are added up to obtain a total background corrected detector image frame. Then a background corrected transmitted intensity $I_t$ as well as a background corrected beam center are calculated in subsequent step 704.

Depending on the acquisition period $T_{acq}$ and with a view to limiting the computation time, the comparison 701 and the further correction by removal 702 can be applied to each individual detector image frame, or they can be applied to an intermediate detector image frame obtained by adding a plurality of the individual detector image frames. Typically the comparison 701 and further correction 702 will be applied to individual detector image frames of a few seconds, e.g. from 1 second to 10 seconds, to appropriately detect and remove the cosmic background.

In a subsequent step 705 an azimuthal averaging is carried out in the total background corrected detector image frame obtained in step 703 around the background corrected beam center obtained in step 704 in order to convert the 2D intensity distribution into a 1D background corrected intensity distribution as a function of momentum transfer Q, and the 1D background corrected intensity distribution is converted into absolute intensities based on the value of the background corrected transmitted intensity $I_t$.

Finally, in a further step 706, this 1D background corrected intensity distribution in absolute intensities is corrected by means of a 1D background corrected calibration intensity distribution in absolute intensities which is similar to the 1D calibration intensity distribution in absolute intensities obtained in step 304 and can be obtained by applying the background removal of the data posttreatment process 700 not only to the individual detector image frames but also to the individual detector image calibration frames obtained in step 301.

Figure 8A:
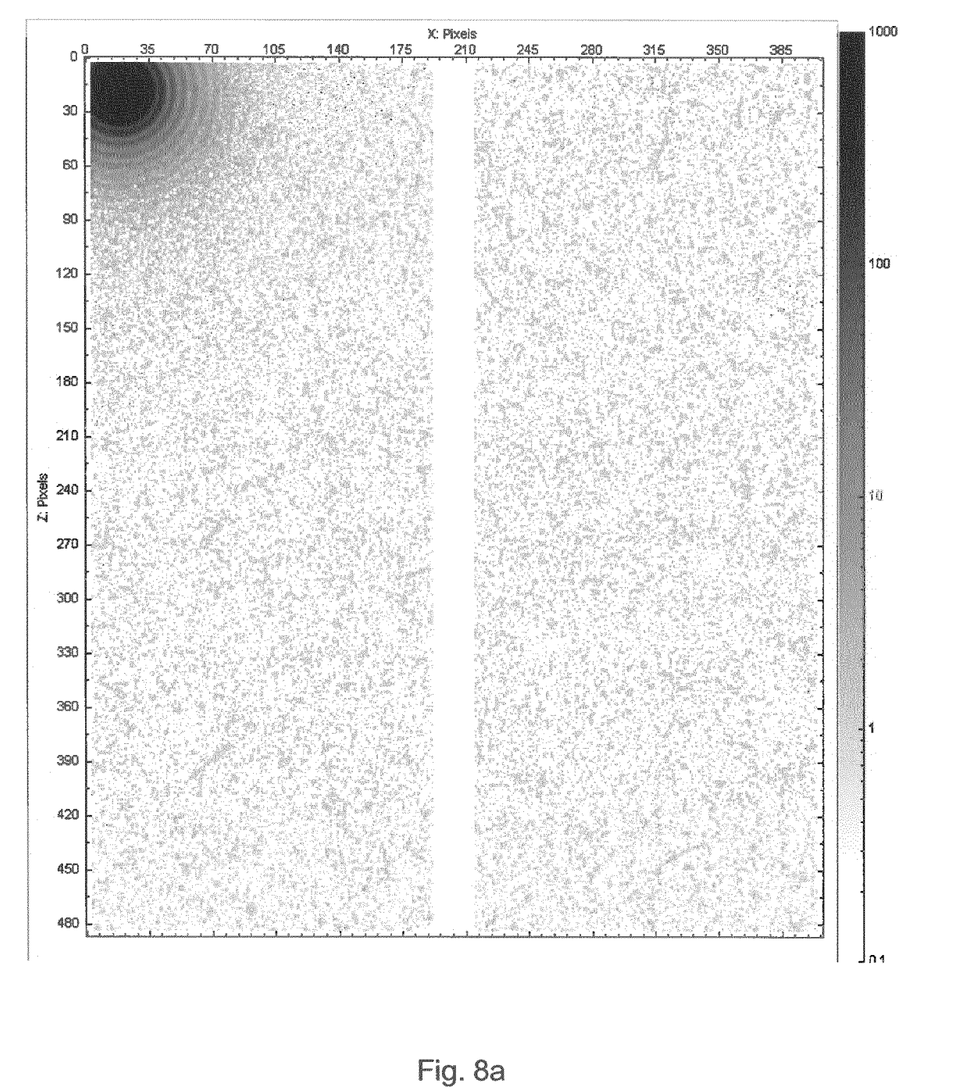
FIG. 8a shows a total detector image frame displayed on a screen while a SAXS method according to the invention is carried out.

FIG. 8*a* shows a total detector image frame displayed on a screen while a SAXS method according to the invention is carried out on a sample. This screen is connected to the computer which in turn is connected to the detector. This computer may or may not be the central control computer of the apparatus according to the invention. The transmitted beam and the scattered X-rays can be seen in the upper left corner of the screen. The white vertical stripe in the middle of the screen is an artifact resulting from inactive detector pixels.

Figure 8B:
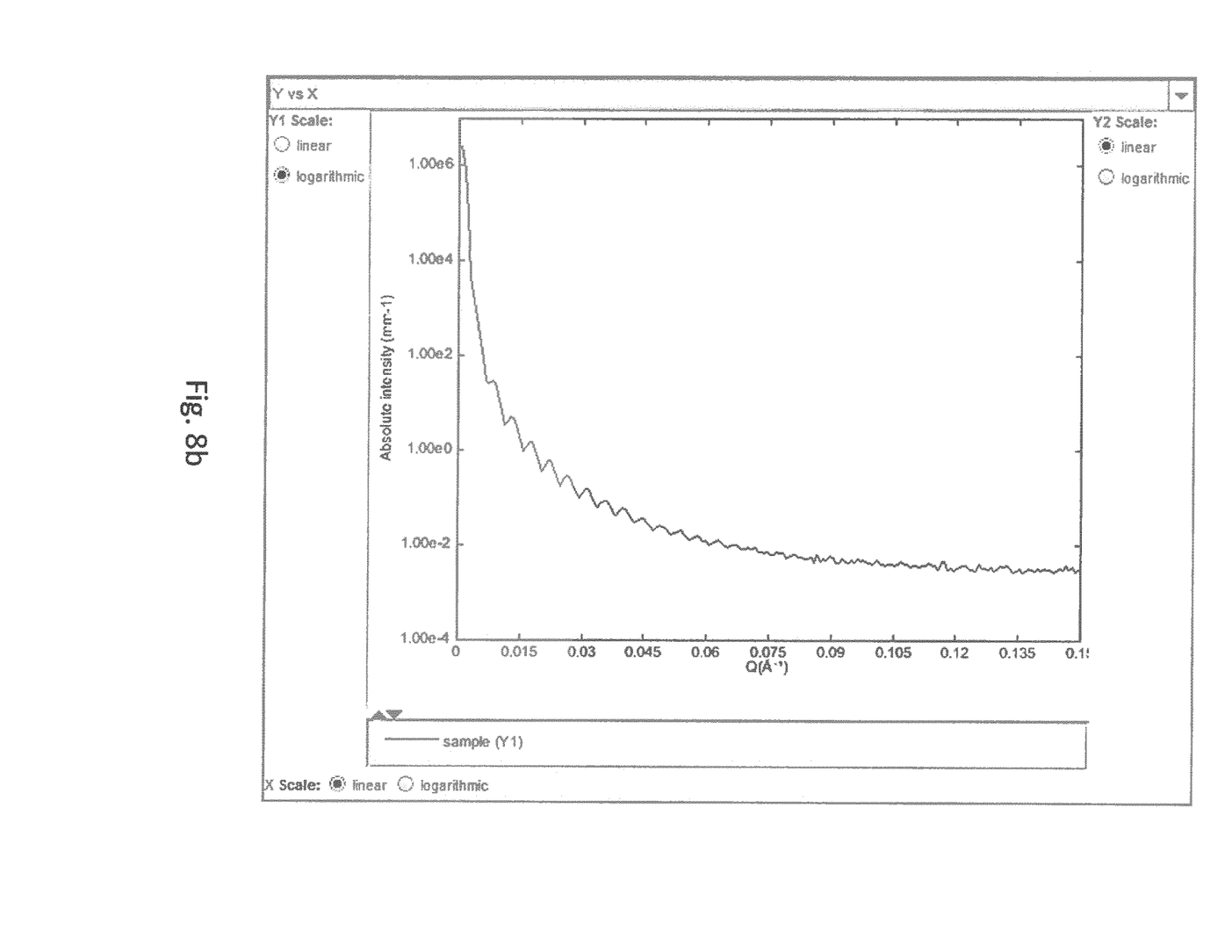

FIG. 8*b* shows a 1D intensity distribution as a function of momentum transfer Q determined on the basis of the total detector image frame of FIG. 8*a* by carrying out azimuthal averaging. In this specific case the sample contained $SiO_2$ nanoparticles.

Figure 9A:
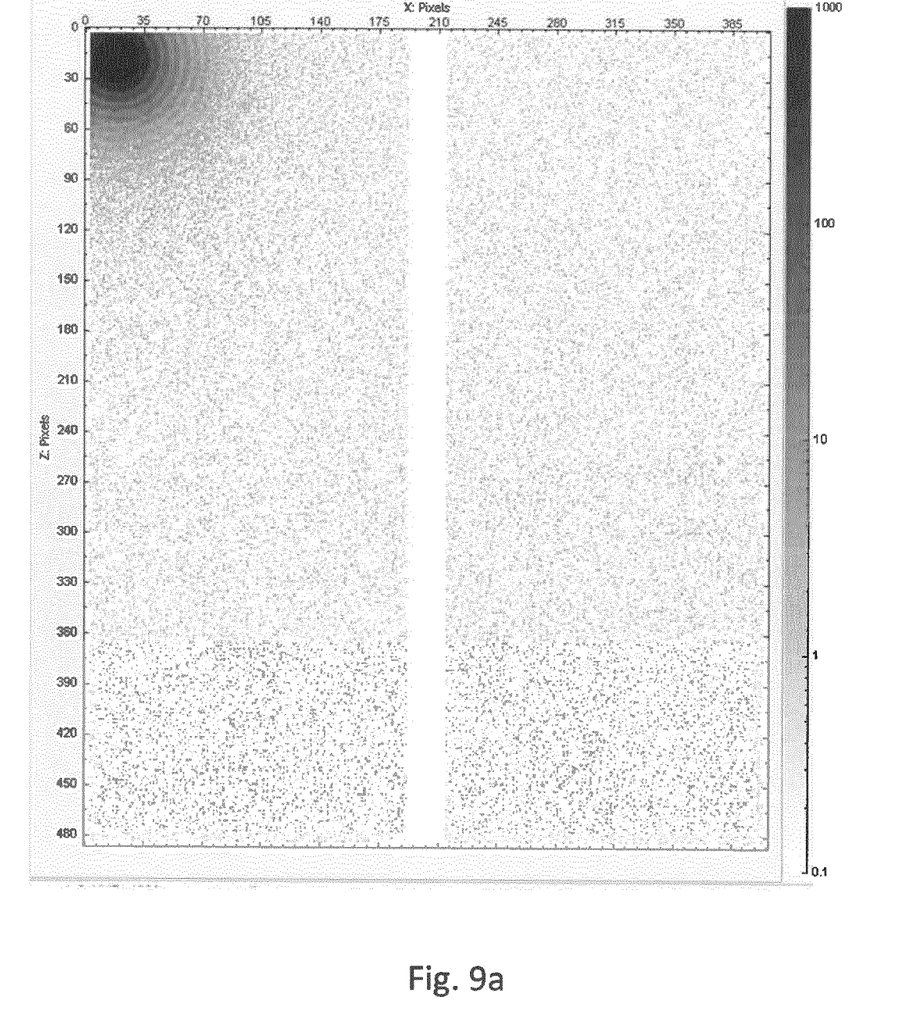
FIG. 9a shows a total background corrected detector image frame displayed on a screen after a SAXS method according to the invention including a data posttreatment process has been carried out.

FIG. 9*a* shows a total background corrected detector image frame displayed on a screen after a SAXS method according to the invention including a data posttreatment process has been carried out. Many streaks visible in FIG. 8*a*, e.g. near a position X=80, Z=390, which are caused by cosmic background, have been successfully eliminated thus showing the data quality improvement achieved by the background correction.

Figure 9B:
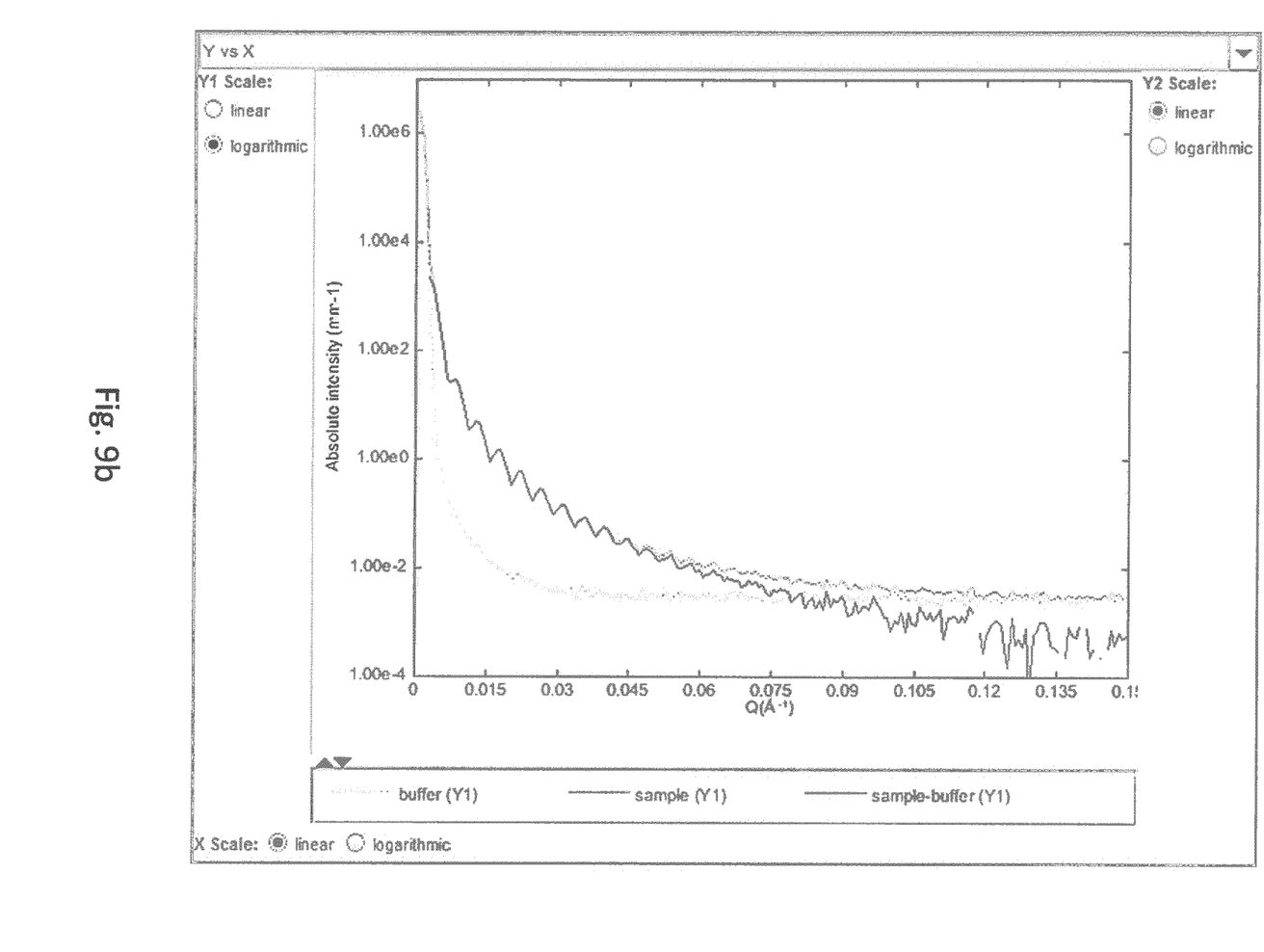

FIG. 9*b* shows a 1D background corrected intensity distribution as a function of momentum transfer Q determined on the basis of the total background corrected detector image frame of FIG. 9*a*. The upper solid grey curve shows a 1D background corrected intensity distribution as a function of momentum transfer Q determined on the basis of the total background corrected detector image frame of FIG. 9*a* by carrying out azimuthal averaging.

The lower dotted grey curve in FIG. 9*b* shows the corresponding 1D calibration intensity distribution determined in step 304. The resulting solid black difference curve corresponding to the difference between the upper curve and the lower curve is also shown in FIG. 9*b*.

Figure 10:
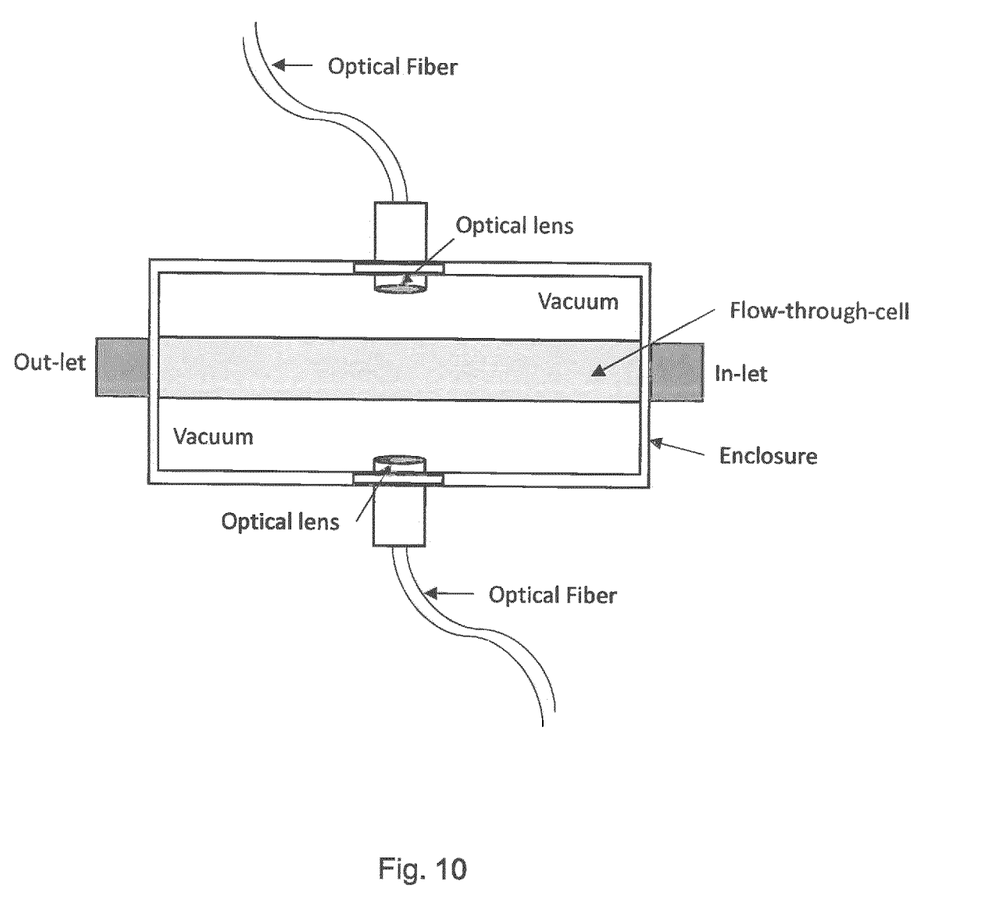
FIG. 10 shows details of a sample environment of an X-ray scattering apparatus according to the invention adapted to carry out a UV-Vis analysis.

FIG. 10 shows details of a X-ray scattering apparatus according to the invention adapted to carry out a UV-Vis analysis.

When using FPLC (Fast Protein Liquid Chromatography) or other techniques to separate biomolecules by molecular mass, the sample is pushed through a size exclusion column full of packed small beads that makes low weight molecules bounce around longer in the column than heavy molecules, resulting in a separation of sizes as the sample is pushed through the column with sample buffer. The individual separated species in the constant flow are identified by an increase in UV absorption as they pass a UV exposure cell on the exit of the size exclusion column on the FPLC instrument. The individual species create an absorption peak when they flow pass the FPLC UV-cell over time with the large species passing out first, followed by the smaller species. The constant flow from the FPLC can be connected to a SAXS flowcell for SAXS exposure. Due to the Taylor dispersion effect (caused by a parabolic flow profile in the tubing), the separated molecules flowing in the tubing will again start to mix which can be seen as a broadening of the absorption peaks compared to the one obtained at the exit of the size exclusion column.

UV-Vis at exactly the same position as the SAXS measurement, ensures that the concentration of the x-ray exposed sample is correct. Selecting the correct x-ray acquisition time is important. It should be long enough to get sufficient signal for SAXS data analysis, but short enough that you only obtain data on the fully separated molecule (the top of an absorption peak) and not on an average of either multiple peaks or over an entire peak.

Getting the right acquisition time is dependent on the concentration and molecular weight of the species that comes out, since that is proportional to the scattered intensity. Practically, the acquisition time is set at some fixed time that is guessed would be the optimal for the particular sample.

2a) By choosing a small acquisition time, many frames could be acquired and afterwards summed or integrated to ether to obtain the best tradeoff between separation resolution and scattering data quality by adjusting the summation of data detector images around individual UV-VIS absorption peaks.

2b) To improve the SAXS SNR while still maintaining a desired separation resolution, multiple SEC-SAXS runs of the same sample could be acquired and the SAXS frames corresponding to the exact same concentrations on the individual absorption peaks could be binned together.

The invention claimed is:

1. Method for X-Ray Scattering material analysis, in particular Small Angle X-ray Scattering material analysis, comprising:
   generating and directing an incident X-ray beam along a propagation direction (X) to a sample held in a sample environment;
   executing a sample measurement process (400) comprising the following steps:
      determining a distribution of X rays scattered from said sample by means of an area detector (10) arranged downstream of said sample environment; and
      determining an intensity (It) of a beam of X rays transmitted through said sample by means of said detector (10);
   executing a sample data treatment process (500) comprising the following step:
      determining an absolute scattered X-ray distribution by applying to said scattered X-ray distribution a conversion into absolute intensities which depends on said transmitted intensity; and
   executing a data analysis process (800) comprising the following step:
      determining at least one structural characteristic of said sample on the basis of said absolute scattered X-ray distribution;
   characterized in that
   acquisition of said scattered and said transmitted X-rays is divided into a plurality of acquisition periods, wherein each acquisition period (Tacq) is shorter than or equal to a previously determined maximum acquisition time (Tmax) in such a way that said detector (10) always operates in a linear range;
   said detector (10) measures individual detector image frames containing signals of said scattered and said transmitted X-rays, wherein each individual detector image frame is measured during one among said plurality of acquisition periods;
   said individual detector image frames are added up to a total detector image frame in a computer connected to said detector (10); and
   said determination of said at least one structural characteristic of said sample is realized based on an absolute scattered X-ray distribution obtained on the basis of said total detector image frame.

2. A method according to claim 1, wherein said total detector image frame is displayed and continuously updated with each additional individual detector image frame on a screen connected to said computer.

3. A method according to claim 1, furthermore comprising a maximum acquisition time determining process (100) executed before said sample measurement process (400), wherein said maximum acquisition time determining process (100) comprises:
   measuring said intensity (It) of a beam of X rays transmitted through said sample; and
   calculating said maximum acquisition time on the basis of said intensity (It).

4. A method according to claim 1, furthermore comprising a beam resolution determining process (200) executed before said sample measurement process (400), wherein said beam resolution determining process (200) comprises:
   measuring at least one individual detector image frame containing signals of an X-ray beam transmitted through said sample environment and of X rays scattered from said sample environment with the sample in place or in a situation in which no sample and no sample solvent is held in said sample environment; and
   determining a beam resolution of said transmitted X-ray beam from said at least one individual detector image frame,
wherein preferably said step of determining a beam resolution comprises executing an azimuthal averaging of said at least one individual detector image frame such as to convert a 2D signal intensity distribution in said individual detector image frame or in a total detector image frame obtained by adding up said individual detector image frames into a 1D intensity distribution as a function of momentum transfer (Q).

5. A method according to claim 1, furthermore comprising a sample environment calibration process (300) executed before said sample measurement process (400), wherein said sample environment calibration process (300) comprises:
   measuring individual detector image calibration frames containing signals of said scattered and said transmitted X-rays by means of said detector (10) in a situation in which no sample is held in said sample environment, wherein each individual detector image calibration frame is measured during one among a plurality of calibration acquisition periods;
   adding up said individual detector image calibration frames to a total detector image calibration frame in said computer connected to said detector (10);
   determining a transmitted intensity and a beam center position from said total detector image calibration frame.

6. A method according to claim 5, wherein said sample environment calibration process (300) furthermore comprises executing an azimuthal averaging of said total detector image calibration frame such as to convert a 2D signal intensity distribution in said total detector image calibration frame into a 1D calibration intensity distribution as a function of momentum transfer (Q),
wherein preferably said conversion is realized continuously between scattered signals corresponding to a finite momentum transfer Q>0 and transmitted signals measured along said propagation direction (X) corresponding to no momentum transfer Q=0.

7. A method according to claim 1, wherein said data analysis process (800) comprises:
    determining a transmitted intensity and a beam center position from said total detector image frame,
wherein preferably said data analysis process (800) furthermore comprises:
    executing an azimuthal averaging of said total detector image frame such as to convert a 2D signal intensity distribution in said total detector image frame into a 1D intensity distribution as a function of momentum transfer (Q),
wherein preferably said conversion is realized continuously between scattered signals corresponding to a finite momentum transfer Q>0 and transmitted signals measured along said propagation direction (X) corresponding to no momentum transfer Q=0.

8. A method according to claim 7, furthermore comprising correcting said 1D intensity distribution by means of said 1D calibration intensity distribution, preferably furthermore comprising a data quality control process (600) in which a signal to noise ratio in a predetermined range of momentum transfer (Q) in said corrected 1D intensity distribution is compared to a predetermined threshold and a feedback action is executed depending on the result of said comparison,
wherein preferably said feedback action comprises at least one of the following:
    stopping said sample measurement process (400);
    changing a position of said area detector (10);
    changing an opening of one or more collimating apertures.

9. A method according to claim 8, wherein several additional measuring steps are performed with different measuring parameters such as detector position or collimation apertures comprising a final merge step wherein several 1D intensity distributions corresponding to different measuring parameters for different ranges of momentum transfer are joined together in a merged 1D intensity distribution,
wherein preferably the merged 1D intensity distribution is associated to different beam resolution functions obtained by a beam resolution determination process for each of the different measuring parameters.

10. A method according to claim 1, furthermore comprising a data posttreatment process (700), comprising a background removal step in which background signals are removed from said individual detector image frames based on a comparison with said total detector image frame, wherein said background corrected individual detector image frames are added up to a total background corrected detector image frame in said computer, and wherein a background corrected determination of said at least one structural characteristic of said sample is realized based on said total background corrected detector image frame,
preferably furthermore comprising determining a background corrected transmitted intensity and a background corrected beam center position from said total background corrected detector image frame.

11. A method according to claim 10, furthermore comprising executing an azimuthal averaging of said total background corrected detector image frame such as to convert a 2D signal intensity distribution in said total background corrected detector image frame into a 1D background corrected intensity distribution as a function of momentum transfer (Q),
wherein preferably said conversion is realized continuously between background corrected scattered signals corresponding to a finite momentum transfer Q>0 and background corrected transmitted signals measured along said propagation direction (X) corresponding to no momentum transfer Q=0,
preferably furthermore comprising correcting said 1D background corrected intensity distribution by means of said 1D background corrected calibration intensity distribution.

12. A method according to claim 1, furthermore comprising executing UV-Vis analysis on said sample, preferably simultaneously with said sample measurement process.

13. A method according to claim 12, wherein said sample environment comprises a capillary containing said sample and an evacuated capillary holder block holding said capillary, wherein UV-Vis lenses through which incoming UV-Vis light is directed to said sample and transmitted UV-Vis light is directed to a spectrometer, respectively, are inserted into said capillary holder block,
wherein preferably said UV-Vis lenses are mounted into said capillary holder block in a vacuum tight manner.

14. A method according to claim 1, wherein said structural characteristic is a particle size distribution, a particle surface area distribution, a radius of gyration and/or a shape of particles within said sample.

15. An apparatus for X-Ray Scattering material analysis, in particular Small Angle X-ray Scattering material analysis, comprising:
    a sample environment for holding a sample (12);
    an X-ray beam delivery system for generating and directing an incident X-ray beam along a propagation direction (X) to said sample (12);
    an area detector (10) arranged downstream of said sample environment; and
    a central control computer designed to control said apparatus such as to execute the method according to claim 1.

* * * * *